(12) United States Patent
Ikeda et al.

(10) Patent No.: US 7,993,011 B2
(45) Date of Patent: Aug. 9, 2011

(54) PROJECTION DISPLAY DEVICE IN WHICH POSITIONS OF PROJECTION LENS UNIT AND PROJECTION MIRROR UNIT RELATIVE TO ILLUMINATION OPTICAL SYSTEMS ARE SWITCHED

(75) Inventors: Takashi Ikeda, Higashi-Osaka (JP); Hideyuki Kanayama, Uji (JP); Yoshihiro Yokote, Yokohama (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 722 days.

(21) Appl. No.: 12/104,936

(22) Filed: Apr. 17, 2008

(65) Prior Publication Data
US 2008/0266528 A1 Oct. 30, 2008

(30) Foreign Application Priority Data
Apr. 27, 2007 (JP) .................................. 2007-118523

(51) Int. Cl.
*G03B 21/28* (2006.01)
(52) U.S. Cl. .......................................................... 353/69
(58) Field of Classification Search .................... 353/69, 353/70, 81, 98, 122
See application file for complete search history.

(56) References Cited

U.S. PATENT DOCUMENTS
2006/0007403 A1* 1/2006 Berman ........................... 353/33
2006/0238718 A1* 10/2006 Erickson et al. ................ 353/33
2007/0263176 A1* 11/2007 Nozaki et al. ................... 353/69
2008/0218644 A1* 9/2008 Matsumoto et al. ............. 349/8

FOREIGN PATENT DOCUMENTS
JP 2004-085752 A1 3/2004
JP 2004-258620 A1 9/2004
* cited by examiner

*Primary Examiner* — Seung C Sohn
(74) *Attorney, Agent, or Firm* — Marvin A. Motsenbocker; Mots Law, PLLC (57) ABSTRACT

A projection lens unit and a projection mirror unit are moved relative to an illumination optical system, between a first position where an image is projected in a shape that is longer along a direction of projection onto a projection plane and a second position where an image is projected in a shape that is longer along a direction perpendicular to the direction of projection onto the projection plane. When the projection lens unit and the projection mirror unit are located in the first position, a vertically long image is projected onto the projection plane (portrait display). In this state, when the projection lens unit and the projection mirror unit are moved to the second position, a horizontally long image is projected onto the projection plane (landscape display).

7 Claims, 14 Drawing Sheets

PORTRAIT DISPLAY

FIG. 6B

LANDSCAPE DISPLAY

Related Art

FIG. 12A

CEILING INSTALLATION

FIG. 12B

DESKTOP INSTALLATION

FIG. 13B

PORTRAIT DISPLAY

FIG. 13A

LANDSCAPE DISPLAY

Related Art

FIG. 14A

PORTRAIT DISPLAY

FIG. 14B

AFTER IMAGE PROCESSING

Related Art

PROJECTION DISPLAY DEVICE IN WHICH POSITIONS OF PROJECTION LENS UNIT AND PROJECTION MIRROR UNIT RELATIVE TO ILLUMINATION OPTICAL SYSTEMS ARE SWITCHED

This application claims priority under 35 U.S.C. Section 119 of Japanese Patent Application No. 2007-118523 filed Apr. 27, 2007, entitled "PROJECTION DISPLAY DEVICE".

BACKGROUND OF THE INVENTION

1. Field of the Invention

The present invention relates to a projection display device for projecting an image on an imager onto a screen or the like, and in particular is preferably used for a projection display device which projects light onto a projection plane from an oblique direction at a large spread angle.

2. Description of the Related Art

Figure 11:
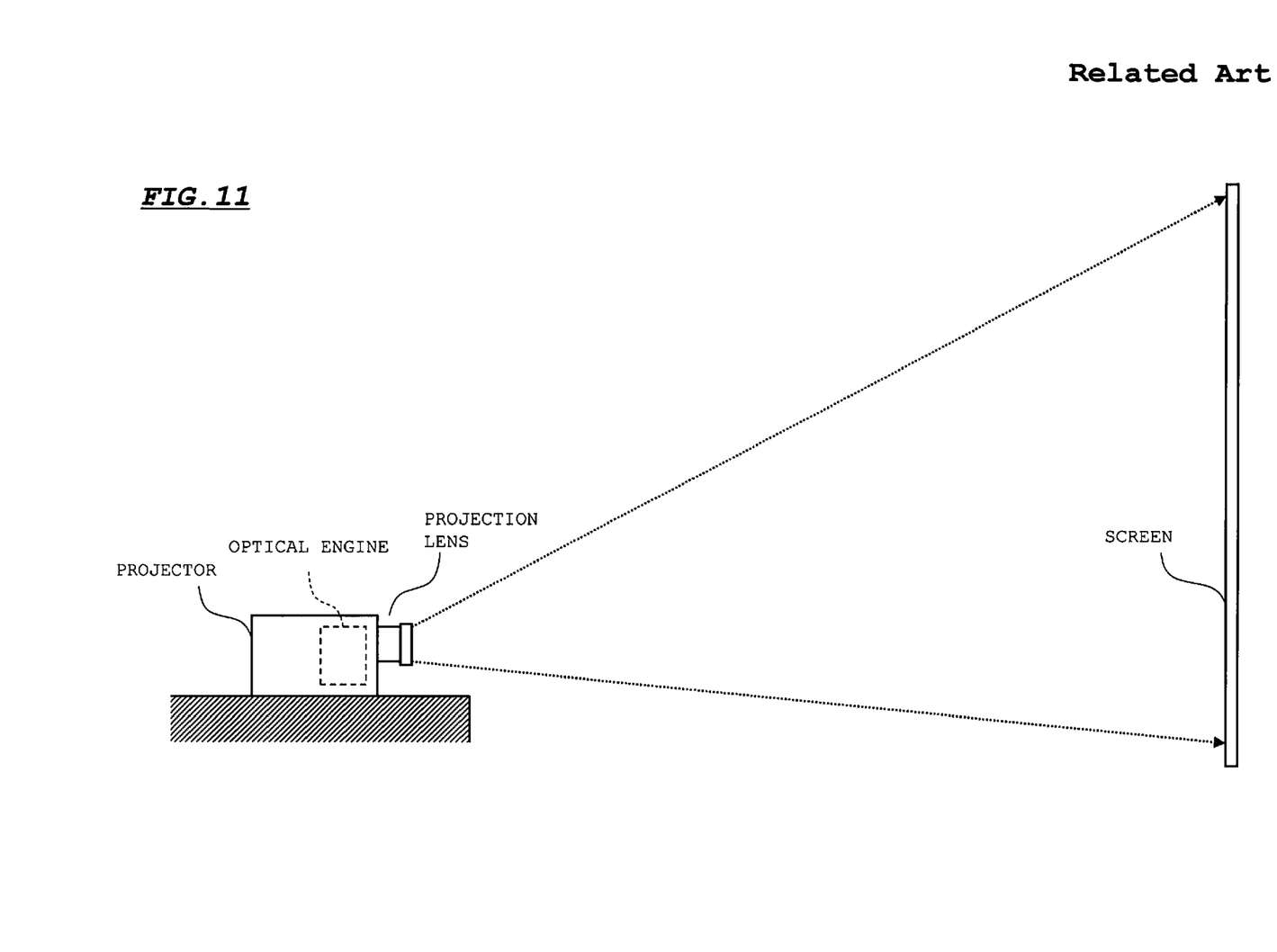
FIG. 11 is a diagram for describing a background art.

A conventional projection display device (hereinafter referred to as "projector") is configured to project light from an optical engine onto a screen by a projection optical system, as shown in FIG. 11 for example. In this case, image magnification is attained on the screen by leaving a longer distance between the projector and the screen. However, no person or object can be located in a space between the projector and the screen, which leads to a problem of the space being not useful.

This problem can be solved by shortening a throw distance from the projector, for example. To that end, however, it is necessary to increase a diameter of a projection lens and decrease a focus length (giving a larger curvature of a projection lens), thereby causing a problem in which a projection lens needs to be of a huge size.

Figures 12A, 12B:
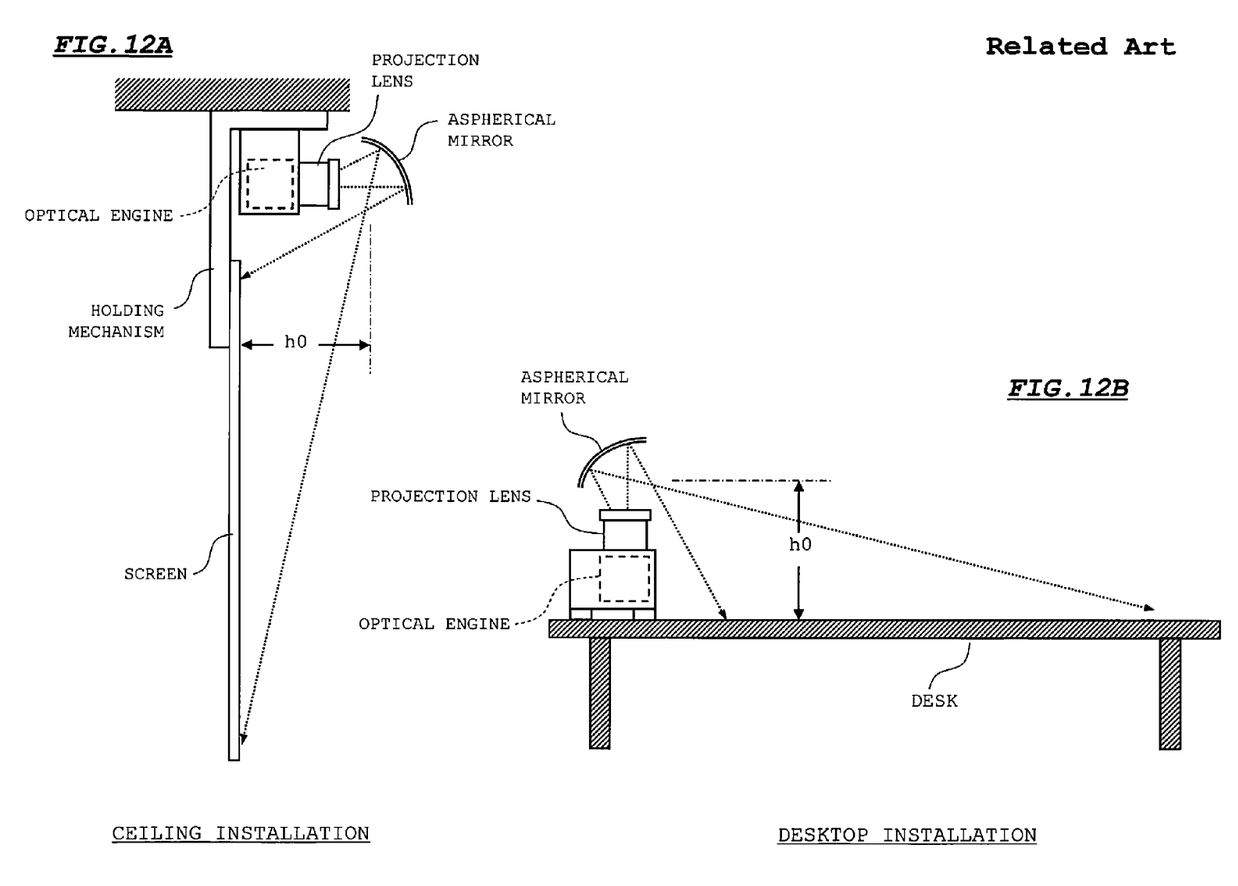
FIGS. 12A and 12B show usage patterns of a projector which projects light at a wide angle.

Meanwhile, it is possible to increase a spread angle of light projected from the projection optical system by reflecting the light by an aspherical mirror. According to this method, light is projected onto a screen plane from an oblique direction as shown in FIGS. 12A and 12B, and thus the projected light is less prone to be interrupted by an obstacle or the like. In addition, an increase in a spread angle of projected light (hereinafter referred to as "angle widening" of projected light) can be achieved by an aspherical mirror, avoiding the projection lens from being huge in size unlike the aforementioned case. Angle widening is achieved with use of a relatively small aspherical mirror, which prevents upsizing of a projector and increase in cost.

Figure 13A:
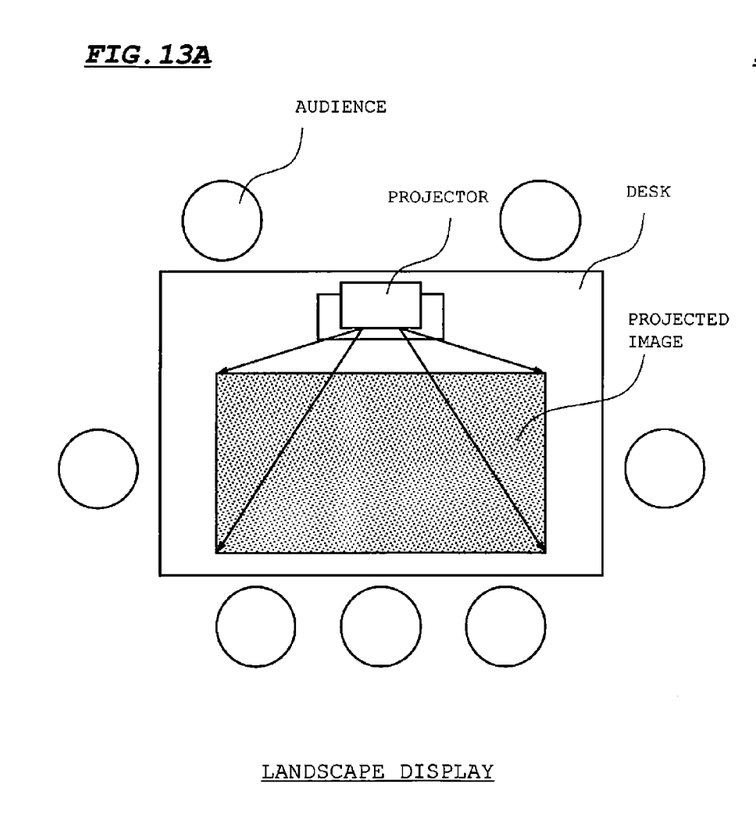
FIGS. 13A and 13B are diagrams for describing display patterns of landscape display and portrait display.
Figure 13B:
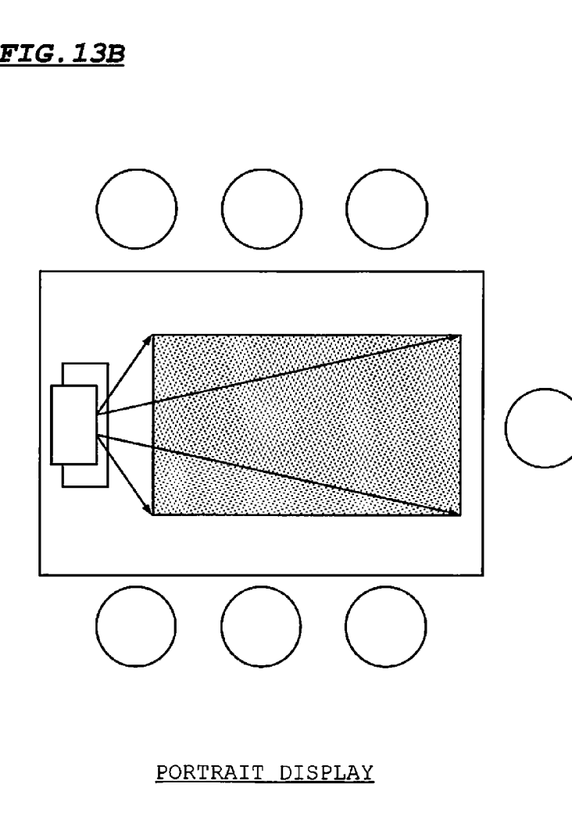
Figure 14A:
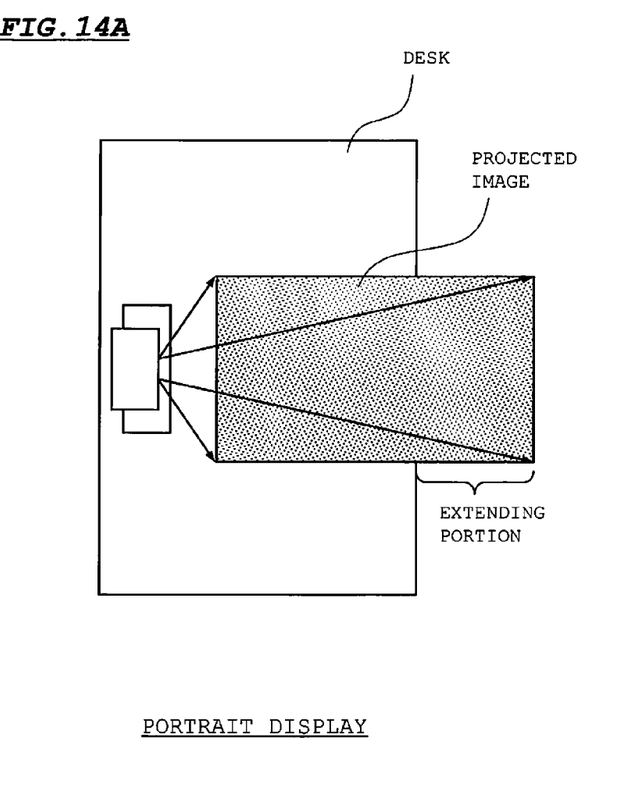
FIG. 14 is a diagram for describing a problem with portrait display.

The foregoing projector using oblique projection may have either of two configurations for displaying a vertically long image (portrait display type) and displaying a horizontally long image (landscape display type). FIGS. 13A and 13B illustrate usage patterns of these projectors placed on a desktop. Whether landscape display or portrait display is suitable depends on the shape of a desk surface and positioning of an audience and a projector. Accordingly, if positioning of the projector does not meet the display type with respect to positioning of an audience and the like, for example, there will arise a problem in that a portion of a projection image extends off the desk surface, and the like, as shown in FIG. 14A.

Figure 14B:
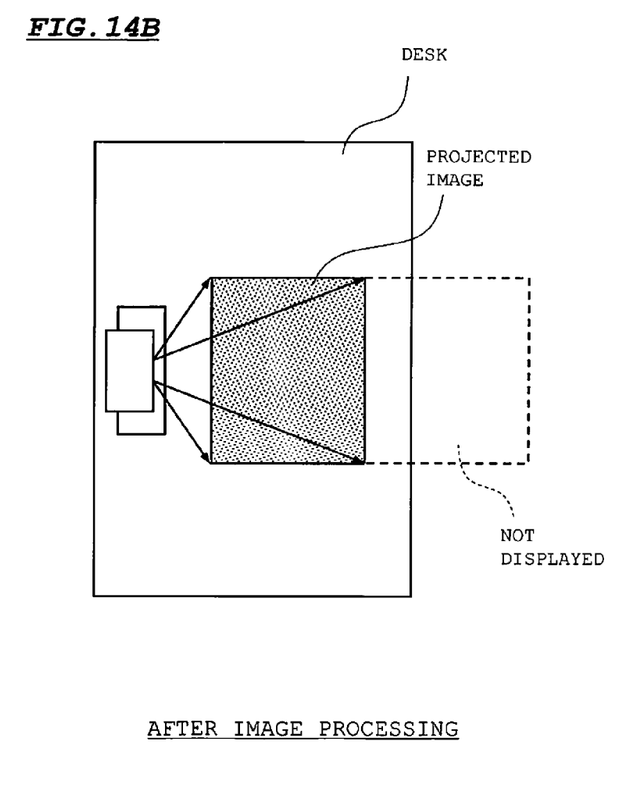

This problem can be resolved by processing a circuit to display the extending portion in black (hide the portion) so that the projected image falls within the desk surface, as shown in FIG. 14B for example. In this case, however, only some of pixels on the imager are used, which leads to deterioration in picture quality of the projected image.

The present invention has been devised to solve the foregoing problems and is intended to provide a projection display device that is capable of projecting an image onto a projection plane in a smooth and favorable manner, without being bound by a shape of a projection plane or positioning of an audience and a projector.

SUMMARY OF THE INVENTION

A principle object of the present invention is to project an image onto a projection plane in a smooth and favorable manner, without being bound by a shape of a projection plane or positioning of an audience and a projector.

A projection display device in one aspect of the present invention comprises: an illumination optical system for illuminating modulated light in accordance with a video signal; a projection lens unit into which light is entered from the illumination optical system; a projection mirror unit for reflecting light from the projection lens unit; and a moving mechanism for moving the projection lens unit and the projection mirror unit relatively to the illumination optical system, between a first position where an image is projected in a shape that is longer along a direction of projection onto a projection plane and a second position where an image is projected in a shape that is longer along a direction perpendicular to the direction of projection onto the projection plane.

According to the projection display device in this aspect, positions of the projection lens unit and projection mirror unit relative to the illumination optical system are switched between the first and second positions, whereby a display type of an image on the projection plane is switched between portrait and landscape display types. Accordingly, it is possible to display an image in an appropriate state on a projection plane, in accordance with a shape of the projection plane and positioning of an audience.

BRIEF DESCRIPTION OF THE DRAWINGS

The foregoing and other objects and novel features of the present invention will be more fully understood by reading the description of embodiments below, in cooperation with referring to the attached drawings.

FIGS. 4A and 48 show a configuration of a projection mirror unit in the embodiment;

However, the drawings are merely intended for illustration and do not limit the scope of the present invention.

DESCRIPTION OF PREFERRED EMBODIMENTS

Figure 1:
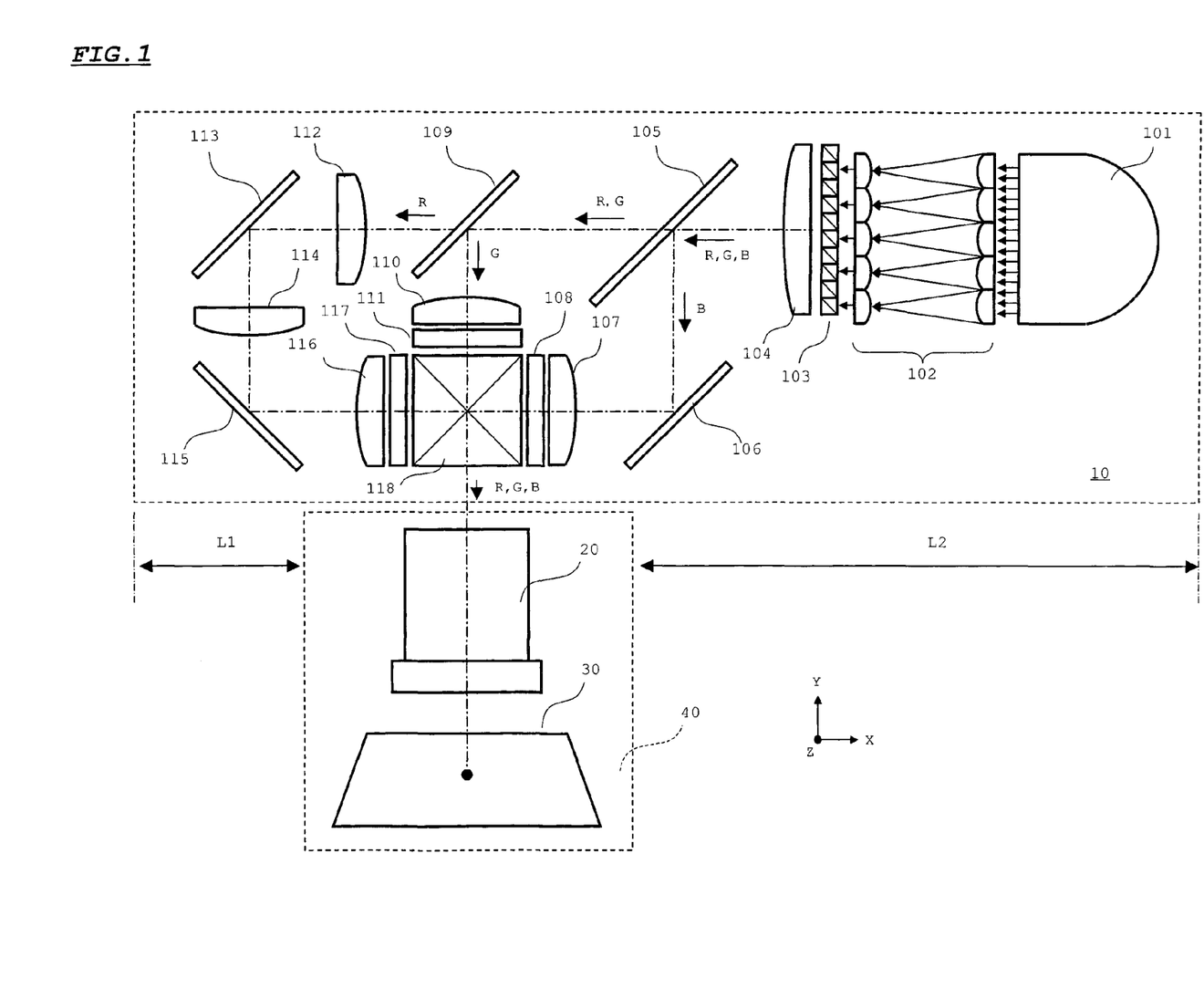
FIG. 1 shows a configuration of a projector in an embodiment of the present invention.

FIG. 1 shows a configuration of a projector in an embodiment.

In FIG. 1, reference numeral 10 denotes an illumination optical system (optical engine), 20 denotes a projection lens unit, 30 denotes a projection mirror unit, 40 denotes a holding mechanism for holding the projection lens unit 20 and the projection mirror unit 30 rotatably in a direction of an X-Z plane with respect to a projector body.

The illumination optical system 10 comprises optical elements from a light source 101 to a dichroic prism 118.

The light source 101 is formed from a lamp and a reflector, and launches approximately parallel light into a fly-eye integrator 102. The fly-eye integrator 102 includes first and second integrators formed from groups of fly-eye lenses, and performs a lens function on light entered from the light source 101 so that light amount distribution of light to be entered into the liquid crystal panels 108, 111 and 117 may be uniform. More specifically, light passing through lenses in the lens groups arranged like fly-eye is entered into the liquid crystal panels 108, 111 and 117 with aspect ratios of these liquid crystal panels, respectively.

A PBS (polarized beam splitter) array 103 has an array of plural PBSs and half-wavelength plates, and unifies polarization directions of light entered from the fly-eye integrator 102. A condenser lens 104 performs a collecting function on light entered from the PBS array 103.

A dichroic mirror 105 reflects, out of light entered from the condenser lens 104, only light in a blue wavelength band (hereinafter referred to as "B light") and lets light in a red wavelength band (hereinafter referred to as "R light") and light in a green wavelength band (hereinafter referred to as "G light") pass through, for example. A mirror 106 reflects the B light reflected by the dichroic mirror 105 to enter the light into a condenser lens 107. The condenser lens 107 performs a lens function on the B light so that the B light is entered in an approximately parallel state into the liquid crystal panel 108. The liquid crystal panel 108 is driven in accordance with a video signal for blue color and modulates the B light in accordance with a driven state. The B light passing through the condenser lens 107 is entered into the liquid crystal panel 108 via a polarizer (not shown).

Out of the R and G light passing through the dichroic mirror 105, a dichroic mirror 109 reflects only the G light, for example. The condenser lens 110 performs a lens function on the G light so that the G light is entered in an approximately parallel state into the liquid crystal panel 111. The liquid crystal panel 111 is driven in accordance with a video signal for green color and modulates the G light in accordance with a driven state. The G light passing through the condenser lens 110 is entered into the liquid crystal panel 111 via a polarizer (not shown).

Relay lenses 112 and 114 perform a lens function on the R light such that a state of incidence of the R light into the liquid crystal panel 117 becomes equal to states of incidence of the B and G light into the liquid crystal panel 108 and 111. Mirrors 113 and 115 change an optical path of the R light passing through the dichroic mirror 109 such that the R light is guided to the liquid crystal panel 117. A condenser lens 116 performs a lens function on the R light so that the R light is entered in an approximately parallel state into the liquid crystal panel 117. The liquid crystal panel 117 is driven in accordance with a video signal for red color and modulates the R light in accordance with a driven state. The R light passing through the condenser lens 116 is entered into the liquid crystal panel 117 via a polarizer (not shown).

A dichroic prism 118 synthesizes the B, G and R light modulated by the liquid crystal panels 108, 111 and 117, and enters the synthesized light into the projection lens unit 20. The projection lens unit 20 includes a group of lenses for forming an image with projected light on a projection plane. The projection mirror unit 30 projects the light entered from the projection lens unit 20, at a wider angle, onto a projection plane.

Next, a configuration of the holding mechanism 40 will be described with reference to FIGS. 2A to 2D and 3A to 3D.

Figure 2A:
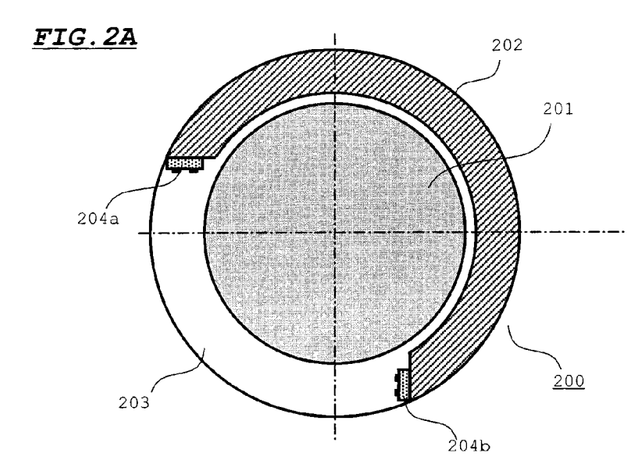
FIGS. 2A to 2D show a configuration of a holding mechanism in the embodiment.
Figure 2B:
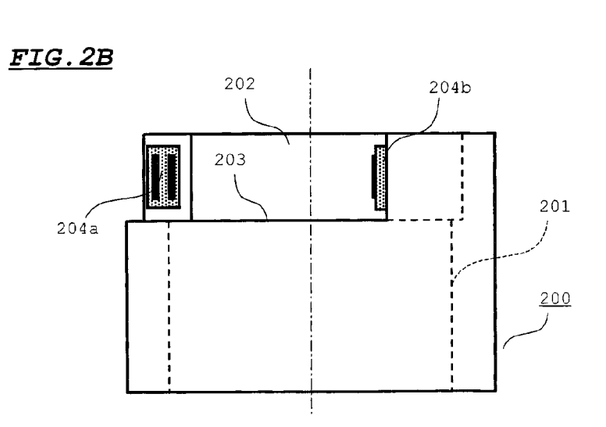

First, a configuration of a first holding tube 200 will be discussed with reference to FIGS. 2A and 2B. FIGS. 2A and 2B are top and front views of the first holding tube 200, respectively. The first holding tube 200 is comprised of a bottomless cylinder having a circular opening 201 at a center thereof. A wall 202 is formed on an upper surface of the first holding tube 200, and an arc-shaped notch 203 is formed in part of the wall 202. In addition, contact switches 204a and 204b are attached to two side surfaces of the wall 202 at boundaries with the notch 203, respectively, and these switches become conductive by contact with a conductive plate. The first holding tube 200 is fixed to a cabinet at a projector body side.

Figure 2C:
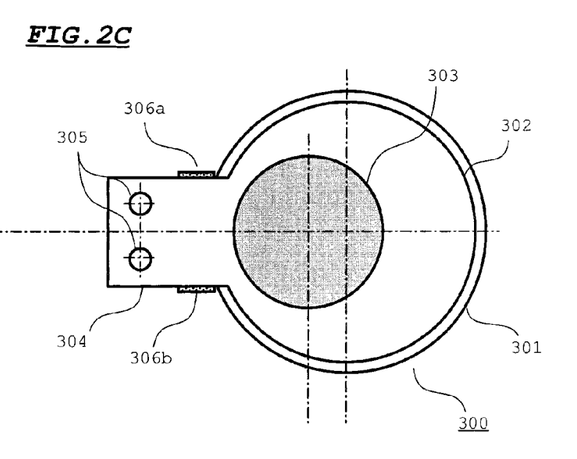
Figure 2D:
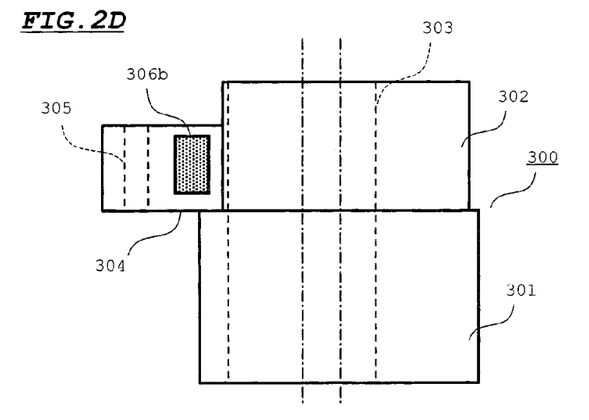

Next, a configuration of a second holding tube 300 will be discussed with reference to FIGS. 2C and 2D. FIGS. 2C and 2D are top and front views of the second holding tube 300, respectively. The second holding tube 300 has two concentric circular tube parts 301 and 302. A diameter of the tube part 301 is slightly smaller than a diameter of the opening 201 of the first holding tube 200. In addition, the second holding tube 300 has a circular opening 303 formed to communicate from a lower surface of the tube part 301 to an upper surface of the tube part 302. A center of the opening 303 here is eccentric by a certain distance with respect to a center of the tube parts 301 and 302. The projection lens unit 20 is fitted into the opening 303.

A square-shaped overhang 304 is formed on a side surface of the tube part 302. Two holes 305 are formed in the overhang 304, and also conductive sheets 306a and 306b for contact with the switches 204a and 204b on the first holding tube 200 are attached to a side surface of the overhang 304.

FIGS. 3A to 3D illustrate an assembly process of the holding mechanism 40.

Figure 3A:
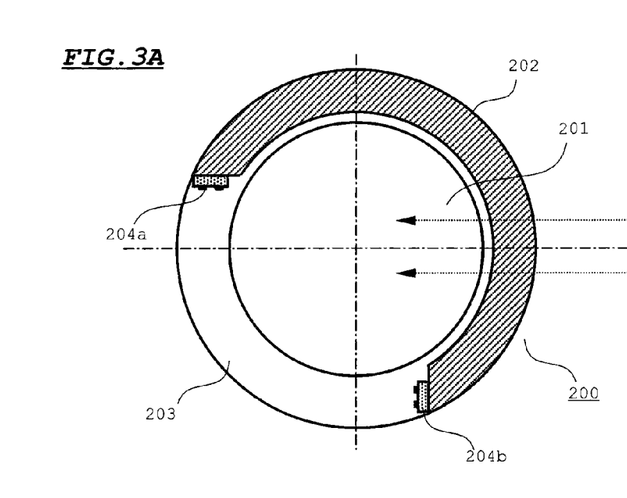
FIGS. 3A to 3D are diagrams for describing an assembly process of the holding mechanism in the embodiment.
Figure 3B:
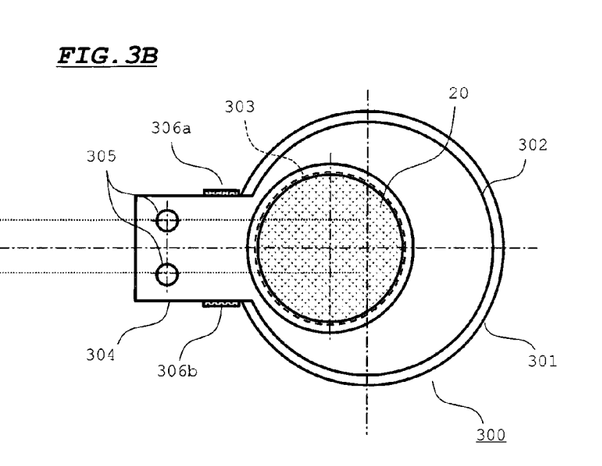
Figure 3C:
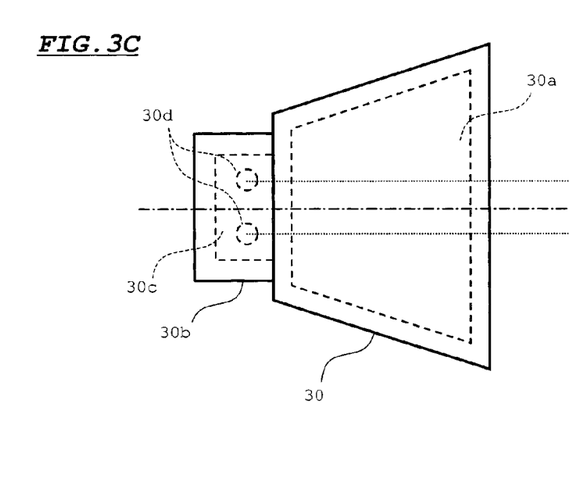
Figure 3D:
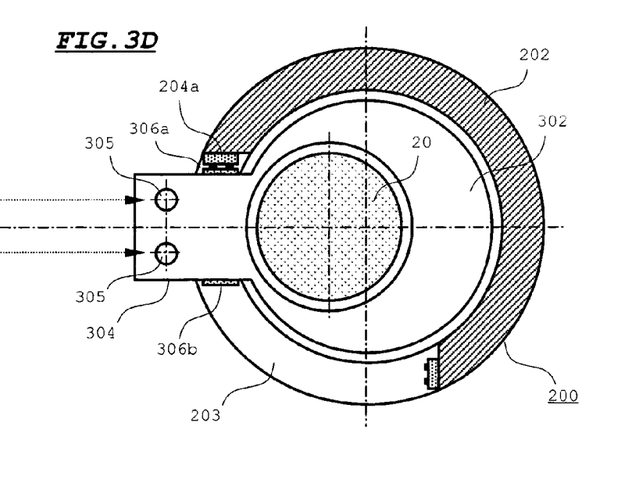

In assembling, the projection lens unit 200 is fitted into the opening 303 of the second holding tube 300, as shown in FIG. 3B. In this state, the tube part 301 of the second holding tube 300 is inserted into the opening 201 of the first holding tube 200 shown in FIG. 3A, and the second holding tube 300 is rotatably supported by the first holding tube 200 as shown in FIG. 3D. Here, the second holding tube 300 is kept by a stopper (not shown) or the like from dropping off the first holding tube 200.

Figure 4A:
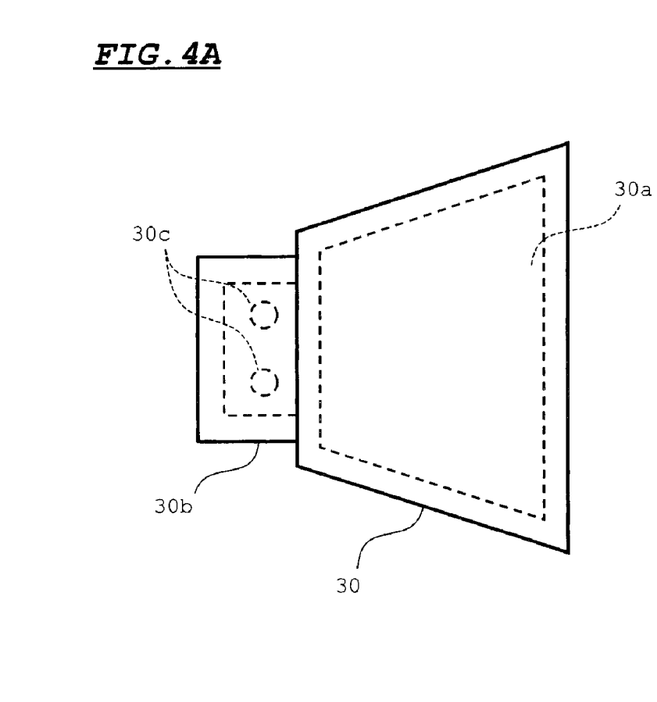
Figure 4B:
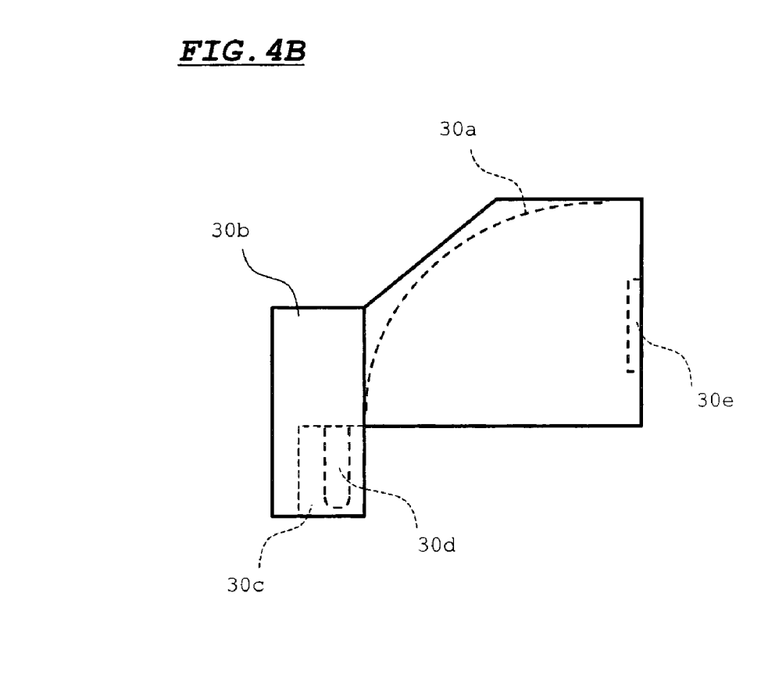

Thereafter, the projection mirror unit 30 is attached to the overhang 304 of the second holding tube 300. FIGS. 4A and 4B illustrate a configuration of the projection mirror unit 30. FIGS. 4A and 4B are top and left side views of the projection mirror unit 30, respectively. As sown in FIGS. 4A and 4B, the projection mirror unit 30 has an aspheric or free-form mirror part 30a, and also includes a concave part 30c with lower and front surfaces opened and an attachment part 30b with two convex parts 30d projecting downward from an upper surface of the concave part 30c. A projection window 30e is formed in a front surface of the housing to let light reflected by the mirror part 30a travel toward a projection plane. The concave part 30c and the convex parts 30d here engage with the overhang 304 and the holes 305 of the second holding tube 300, respectively.

Returning to FIGS. 3A to 3D, the projection mirror unit 30 is attached to the second holding tube 300, by engaging the concave part 30c and the convex part 30d with the overhang 304 and the hole 305 of the second holding tube 300, respectively, and then fixing the attachment part 30b to the overhang 304 of the second holding tube 300 by a fixture such as a screw (not shown), as shown in FIGS. 3C and 3D. Accordingly, the projection lens unit 20 and the projection mirror unit 30 are attached to the second holding tube 300, and the projection lens unit 20 and the projection mirror unit 30 rotate integrally with rotation of the second holding tube 300.

A rotation angle of the second holding tube 300 is set at 90 degrees. The notch 203 of the first holding tube 200 is predetermined in circumferential length such that the rotation angle of the second holding tube 300 becomes 90 degrees.

Figure 5A:
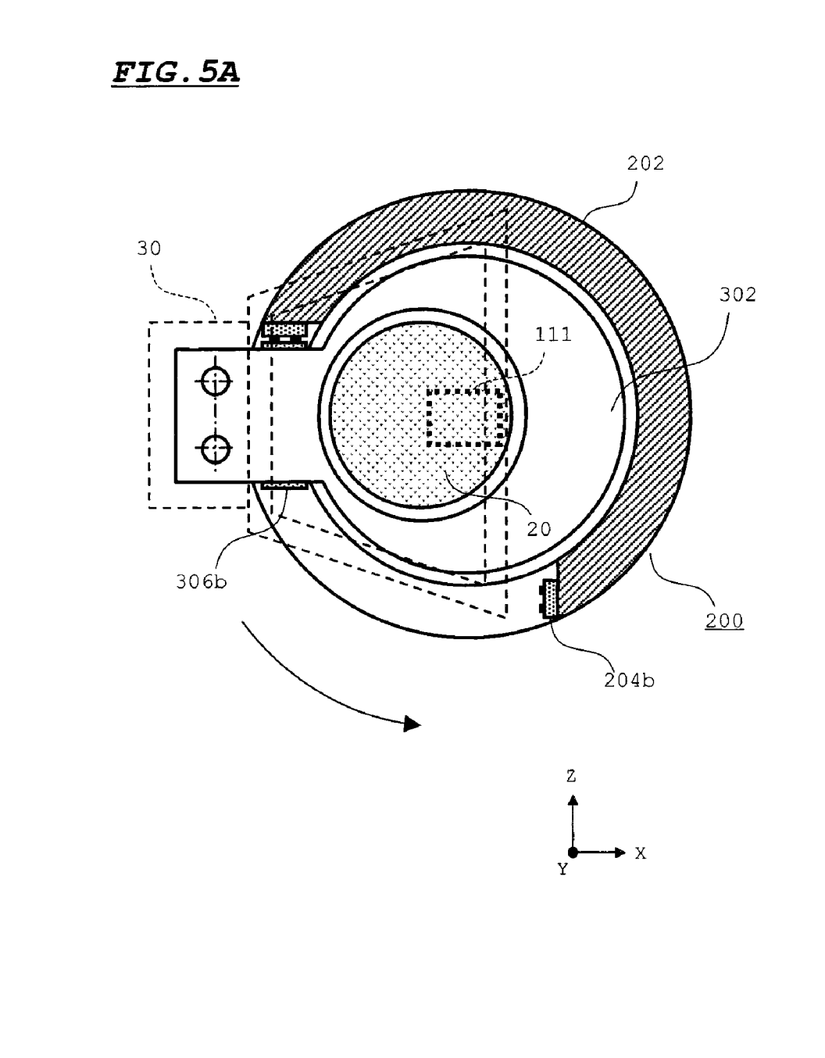
FIGS. 5A and 5B are diagrams for describing a switching operation of projection modes in the embodiment.
Figure 5B:
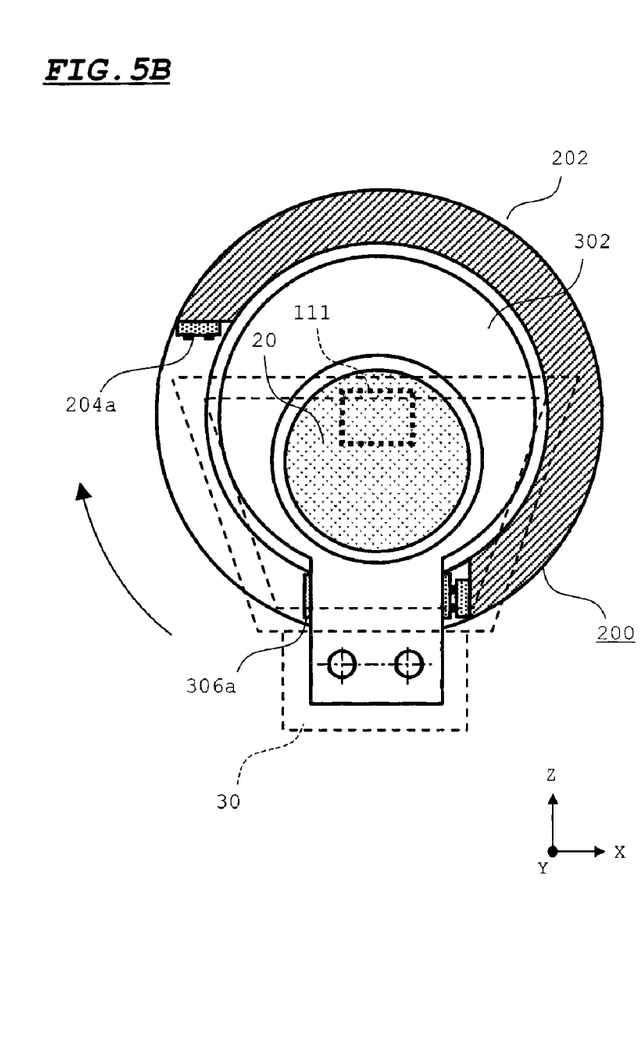

FIGS. 5A and 5B illustrate a switching operation of projection mode. FIGS. 5A and 5B each provide a perspective view of a display area of a liquid crystal panel 111 when the projection mirror unit 20 is seen from the front, by dotted lines.

Projection mode switching is carried out by rotating the second holding tube 300 as shown in FIG. 5A or 5B. The second holding tube 300 may be rotated manually or electrically through a drive source such as a motor under instructions from a remote control or the like. The second holding tube 300 is locked in either state shown in FIG. 5A or 5B by locking means (not shown) as appropriate.

In the state shown in FIG. 5A, the liquid crystal panel 111 is located with respect to the projection lens unit 20 such that a direction of a longitudinal axis of the liquid crystal panel 111 becomes parallel to a plane containing a center of an optical axis of the projection lens unit 20 and a central axis of light projected from the projection mirror unit 30. Although FIG. 5A shows only a perspective view of the liquid crystal panel 111 for convenience of illustration, optical positional relationships between the other liquid crystal panels 108 and 117 and the projection lens unit 20 are the same as the foregoing one. This point applies to the descriptions below. Accordingly, in the state of FIG. 5A, a vertically long image is projected onto the projection plane (portrait display).

In the foregoing state, when the second holding tube 300 is rotated in a direction of an arrow shown in FIG. 5A and located in a position shown in FIG. 5B, the liquid crystal panel 111 is located with respect to the projection lens unit 20 such that a direction of a short axis thereof is parallel to the plane containing the center of the optical axis of the projection lens unit 20 and the central axis of light projected from the projection mirror unit 30. Accordingly, in this state, a horizontally long image is projected onto the projection plane (landscape display).

As stated above, by rotating the second holding tube 300 from a position of FIG. 5A to a position of FIG. 5B, display on the projection plane is switched from portrait display to landscape display. Likewise, by rotating the second holding tube 300 from the position of FIG. 5B to the position of FIG. 5A, display on the projection plane is switched from landscape display to portrait display.

In display switching, the conductive sheets 306a and 306b contact either one of the switches 204a or 204b. In the circuit system, the display mode (portrait or landscape) is identified depending on which of the switches is in the on state, and image processing and the like suitable for each mode is executed in accordance with this identification result.

Figure 6A:
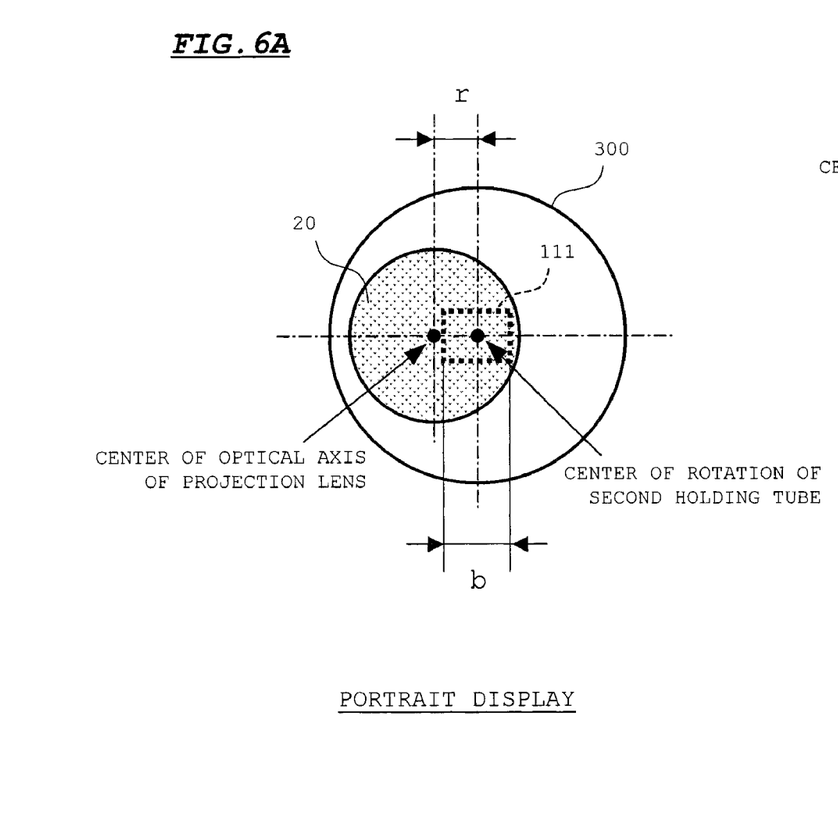
FIGS. 6A and 6B are diagrams for describing an amount of eccentricity of a projection lens unit in the embodiment.
Figure 6B:
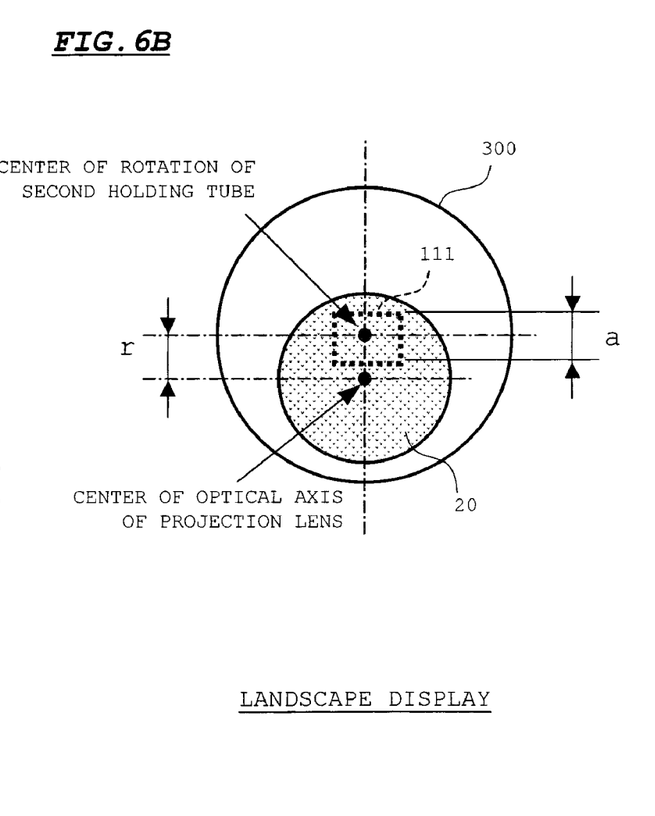

FIGS. 6A and 6B illustrate an amount of eccentricity of a center of an optical axis of the projection lens unit 20 with respect to a center of rotation of the second holding tube 300. In this embodiment, a center of rotation of the second holding tube 300 is positioned at an approximately center position of the liquid crystal panel 111.

As shown in FIGS. 6A and 6B, it is assumed that: an amount of eccentricity between a center of rotation of the second holding tube 300 and a center of optical axis of the projection lens unit 20 is represented by r; a length of the display area of the liquid crystal panel 111 along a longitudinal axis by is represented b; and a length of the display area of the liquid crystal panel 111 along a short axis is represented by a. As understood with reference to FIG. 6A, when the amount of eccentricity satisfies r>b/2, the display area of the liquid crystal panel 111 does not lie over the center of the optical axis of the projection lens unit 20. Since an aspect ratio of the display area has a relationship of b>a, when the amount of eccentricity is set at r>b/2, even if the second holding tube 300 is rotated to a position for landscape display, the display area of the liquid crystal panel 111 does not lie over the center of the optical axis of the projection lens unit 20, as shown in FIG. 6B.

That is, by setting the amount of eccentricity at r>b/2, even if the second holding tube 300 is rotated to either the position of portrait display or the position of landscape display, the display area of the liquid crystal panel 111 does not lie over the center of the optical axis of the projection lens unit 20. Therefore, by setting the amount of eccentricity in this manner, it is possible to achieve favorable projection under magnification both in portrait display and landscape display.

In the case of setting the amount of eccentricity at r>a/2, there may a rise a fault in projection under magnification in portrait display. For example, if the amount of eccentricity is set within a range of b/2≧r>a/2, in landscape display, favorable projection under magnification is achieved in which the display area of the liquid crystal panel 111 does not lie over the center of the optical axis of the projection lens unit 20, whereas, in portrait display, the display area of the liquid crystal panel 111 lies over the center of the optical axis of the projection lens unit 20, thereby causing a fault in projection under magnification in some cases.

Next, a direction of rotation of the second holding tube 300 will be discussed with reference to FIGS. 7A and 7B.

Figure 7A:
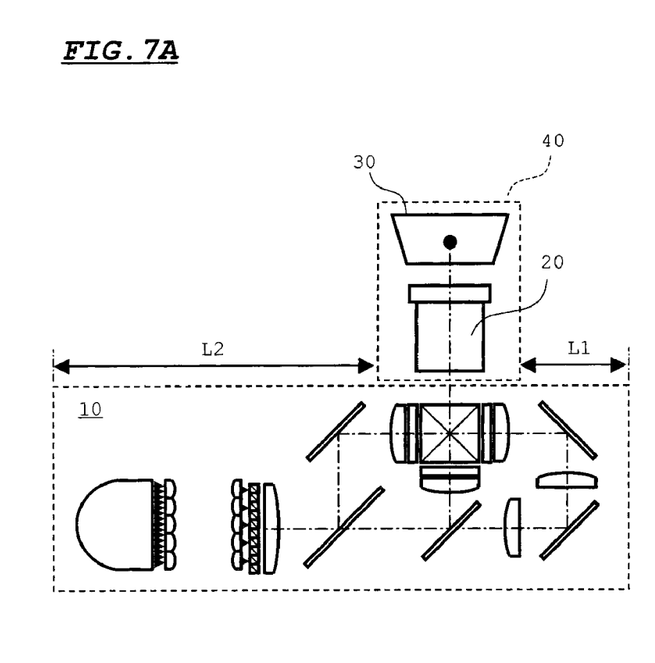
FIGS. 7A and 7B are diagrams for describing a direction of rotation of the projection lens unit in the embodiment.

Assuming that FIG. 7A shows a state of landscape display or portrait display, a placement plane of the illumination optical system 10 is perpendicular to the plane containing the center of the optical axis of the projection lens unit 20 and the central axis of light projected from the projection mirror unit 30, and thus the light projected from the projection mirror unit 30 is not be interrupted by the illumination optical system 10.

In this state, the projection lens unit 20 and the projection mirror unit 30 are rotated by 90 degrees to switch to the other display mode. If the rotation is in a leftward direction in FIG. 7, light projected from the projection mirror unit 30 may be interrupted by the illumination optical system 10 because a length L2, which is in this direction, of the illumination optical system 10 is long. On the other hand, if the rotation of the projection lens unit 20 and projection mirror unit 30 is as shown in FIG. 7B, a length L1, which is in this direction, of the illumination optical system 10 is considerably shorter than the length L2 thereof. Therefore, light projected from the projection mirror unit 30 is not interrupted by the illumination optical system 10 and an angle of the projected light is widened smoothly.

Figure 7B:
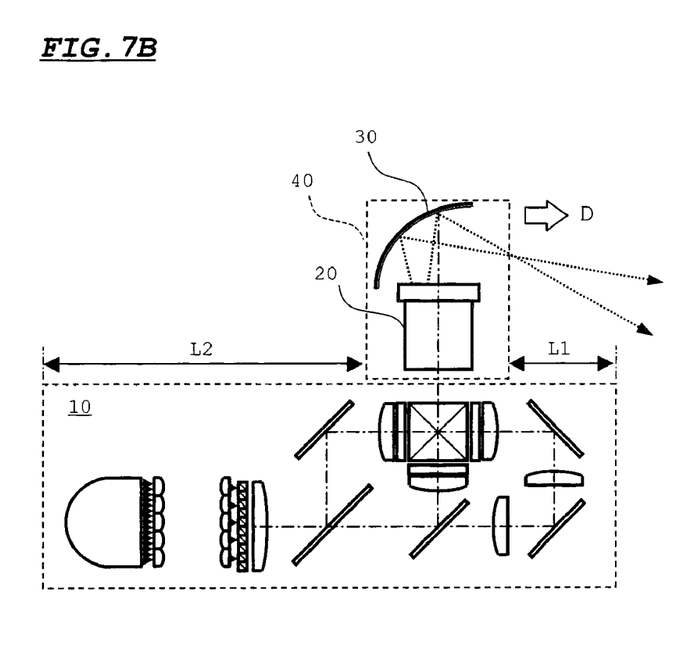

Accordingly, a direction of rotation of the projection lens unit 20 and projection mirror unit 30 is desirably set as shown in FIG. 7B, whereby an angle of projected light is widened smoothly both in landscape display and portrait display.

Also in this case, it is desired to minimize the length L1 in terms of angle widening of projected light. Here, the length L1 can be shortened by adjusting placement patterns of the liquid crystal panels 108, 111 and 117 on the placement plane of the illumination optical system 10. More specifically, the length L1 can be shortened by placing the liquid crystal panels 108, 111 and 117 on the placement plane of the illumination optical system 10 such that a short axis-side surface of each of the liquid crystal panels is positioned on the placement plane.

As understood with reference to FIG. 1, when short axis-side surfaces of the liquid crystal panels 108, 111 and 117 are positioned on the placement plane of the illumination optical system 10, the dichroic prism 118 is reduced in dimension in a direction of an X-Y plane and also the widths of the other optical elements are made smaller in the direction of the X-Y plane, as compared with the case where long axis-side surfaces of the liquid crystal panels are positioned on the placement plane of the illumination optical system 10. As a result, it is possible to downsize the illumination optical system 10 in the direction of the X-Y plane and thus reduce the length L1 in FIG. 1.

Figure 8:
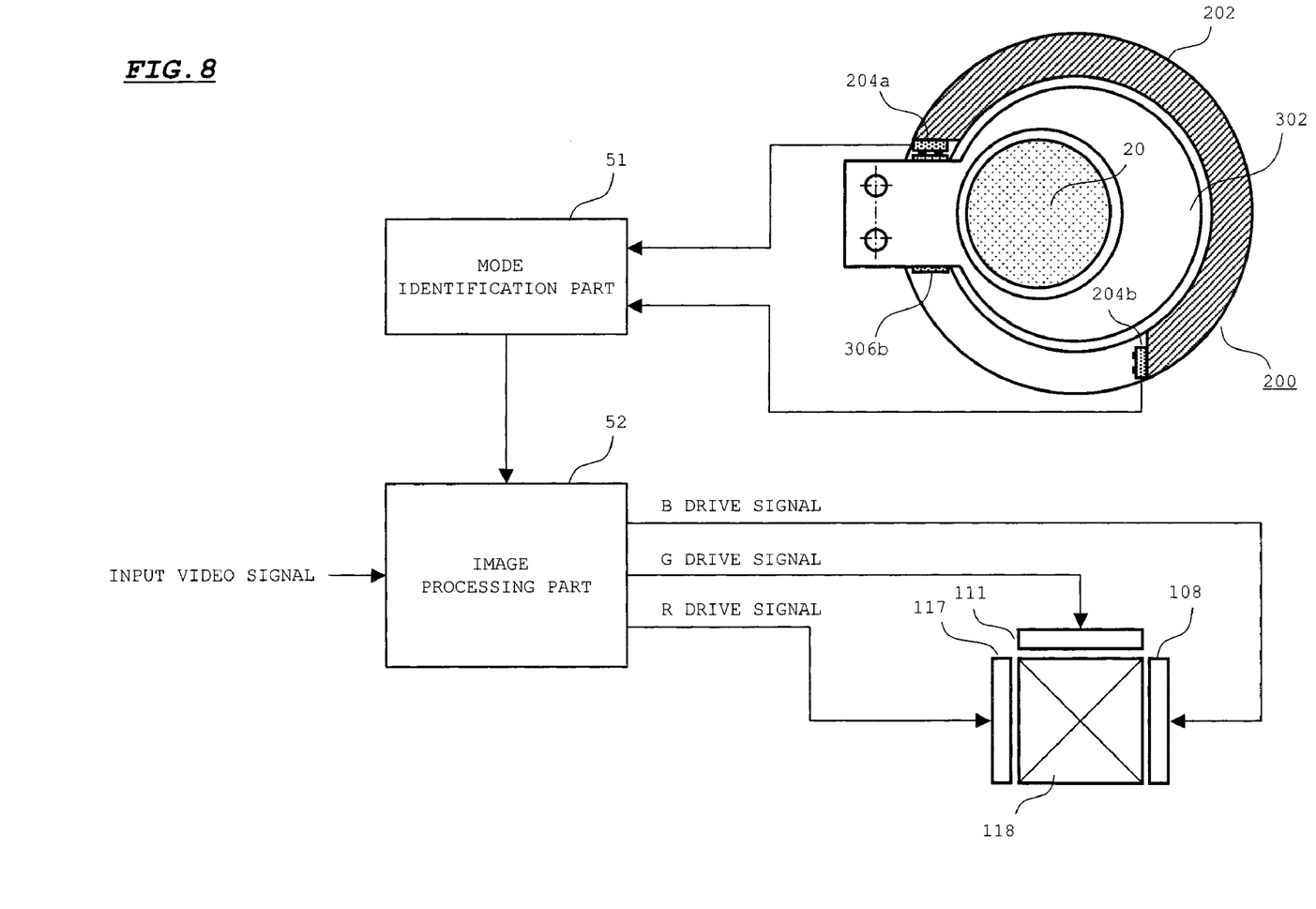
FIG. 8 shows a configuration of an image processing circuit in the embodiment.

FIG. 8 illustrates a configuration of an image processing circuit in this embodiment.

In FIG. 8, a mode identification part 51 identifies whether the projection lens unit 20 and the projection mirror unit 30 are in a landscape display position or a portrait display position, on the basis of the on/off states of the switches 204a and 204b, and outputs an identification result to an image processing part 52. The image processing part 52 processes an input video signal based on the identification result input from the mode identification part 51, and supplies drive signals for B, G and R light to the liquid crystal panels 108, 111 and 117, respectively. The image processing part 52 then switches between correction processes for irregularities, trapezoidal distortion and others, depending on whether the display mode is set at landscape display or portrait display, and executes a process suitable for the display mode on the input video signal. This allows a favorable image to be displayed on the projection plane in both landscape display and portrait display.

As stated above, according to this embodiment, it is possible to project an image onto a projection plane in a smooth and favorable manner by switching between landscape display and portrait display as appropriate, without being bound by the shape of a projection plane, positioning of an audience and a projector, or the like.

In the foregoing embodiment, the projection lens unit 20 and the projection mirror unit 30 are rotated to switch between landscape display and portrait display. Alternatively, the projection lens unit 20 and the projection mirror unit 30 may be fixed and instead the illumination optical system 10 may be rotated to switch between landscape display and portrait display.

Figure 9A:
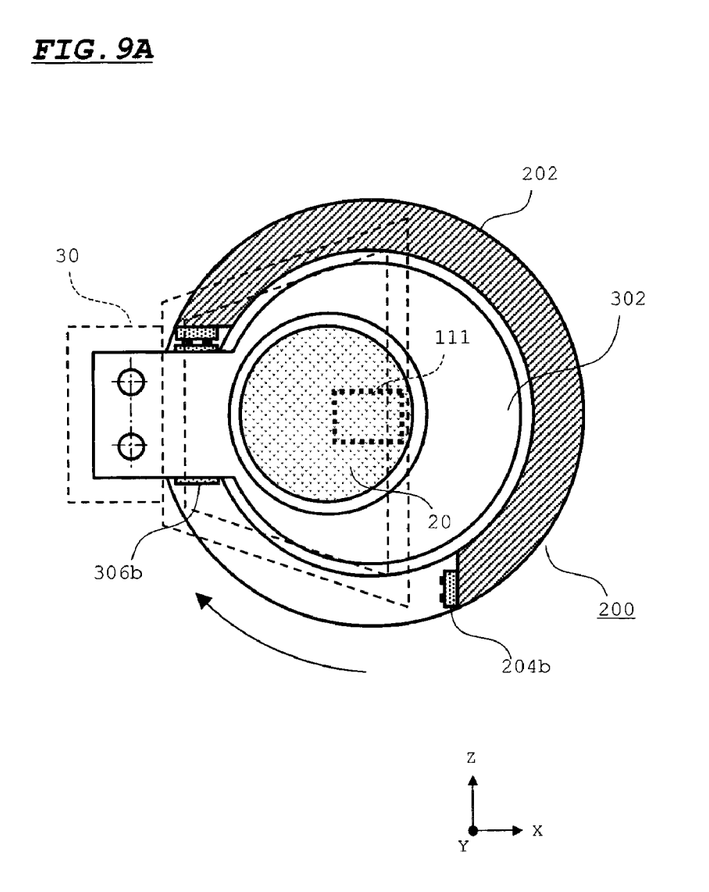
FIGS. 9A and 9B are diagrams for describing a configuration of a holding mechanism in another embodiment.
Figure 9B:
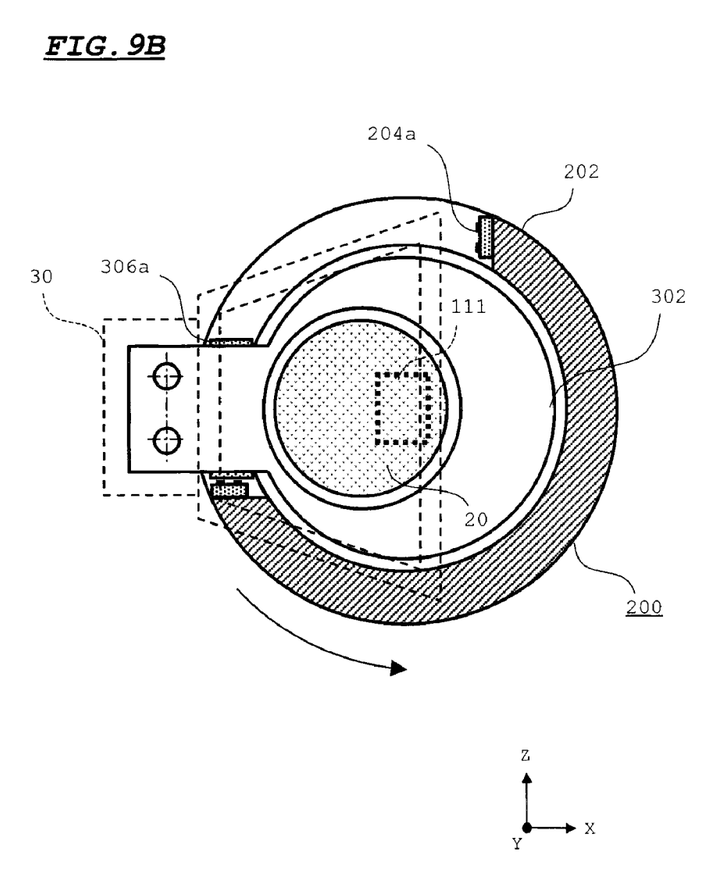

FIGS. 9A and 9B illustrate a configuration example of the alternative case. A configuration example of the holding mechanism 40 is the same as in the foregoing embodiment. However, in the examples of FIGS. 9A and 9B, the second holding tube 300 is fixed, and the first holding tube 200 is configured to rotate with respect to the second holding tube 300. The illumination optical system 10 here is integrated with the first holding tube 200.

FIG. 9A illustrates a positional relationship between the projection lens unit 20 and the liquid crystal panel 111 in portrait display. In this state, when the first holding tube 200 is rotated by 90 degrees in a direction of an arrow shown in FIG. 9A, the illumination optical system 10 rotates accordingly, whereby the liquid crystal panel 111 is located in a position of landscape display, as shown in FIG. 9B.

FIGS. 10A to 10D illustrate usage patterns of a projector in this configuration example. As shown in FIGS. 10A to 10D, in these usage patterns, the projector is attached to a screen holding mechanism 501 to and from which a screen 400 can be attached and detached.

Figures 10A, 10B, 10C, 10D:
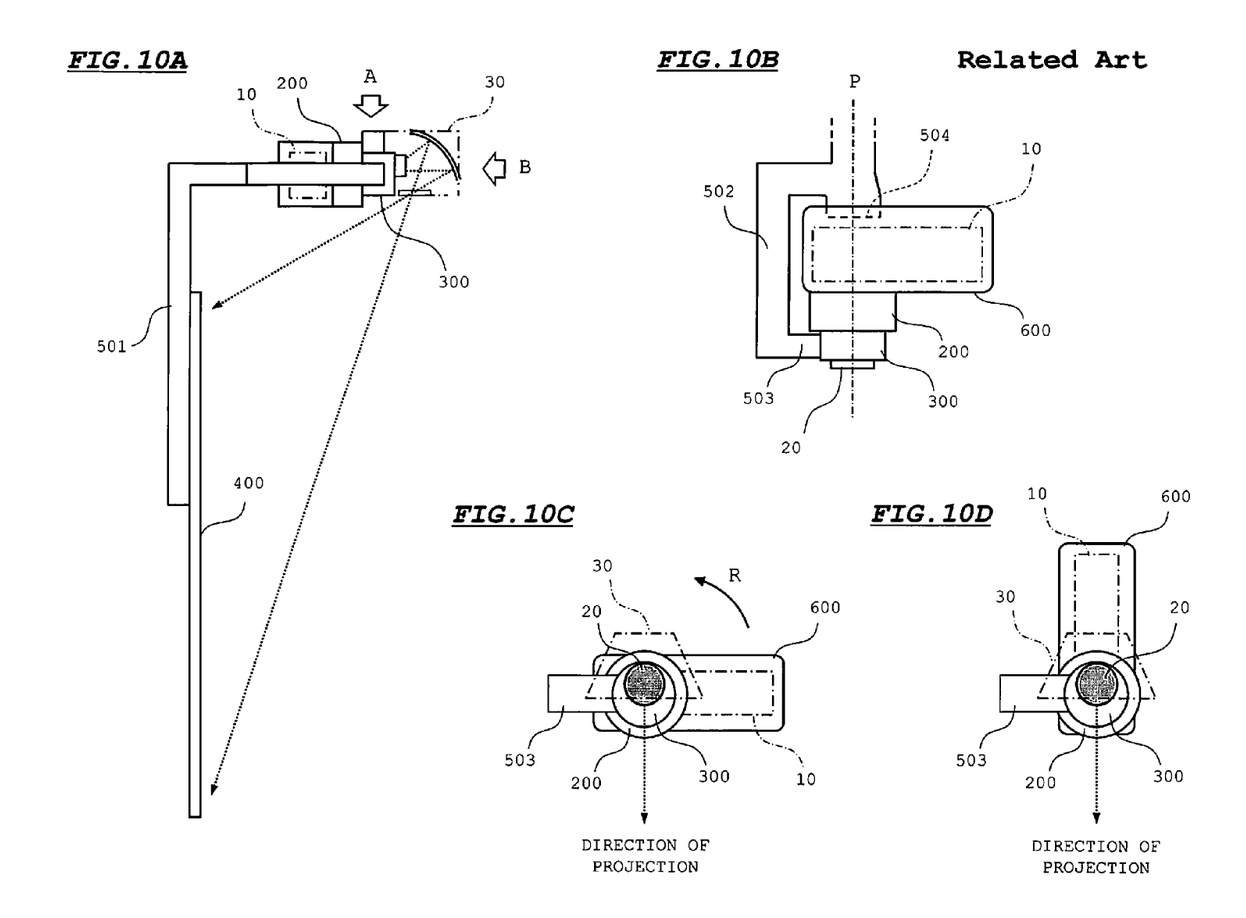
FIGS. 10A to 10D are diagrams for describing usage patterns of a projector in another embodiment.

FIG. 10B shows a view of the projector in FIG. 10A seen from a direction of an arrow A. In FIG. 10B, the overhang 304 and the projection mirror unit 30 are omitted for convenience of illustration.

As shown in FIG. 10B, the screen holding mechanism 501 has an attachment part 502 in a shape of "C". An end 503 of the attachment part 502 is fixed to a side surface of the second holding tube 300. The illumination optical system 10 is stored in a main body cabinet 600, and the first holding tube 200 is fixed to the main body cabinet 600. Further, the main body cabinet 600 has a bearing (not shown) disposed at the side surface opposite to the side on which the first holding tube 200 is attached, and a spindle 504 disposed in the screen holding mechanism 501 is attached to the bearing. This allows the main body cabinet 600 to rotate around an axis P together with the first holding tube 200.

FIG. 10C shows a view of the projector in FIG. 10A seen from a direction of an arrow B. In FIG. 10C, the overhang 304 is omitted for convenience of illustration. In this state, when the main body cabinet 600 is rotated by 90 degrees in a direction of an arrow R in FIG. 10C, the illumination optical system 10 rotates accordingly and is located in a position shown in FIG. 10D. Herewith, positions of the liquid crystal panels 108, 111 and 117 with respect to the projection lens unit 20 are optically rotated by 90 degrees as shown in FIGS. 9A and 9B to switch the display mode between portrait display and landscape display. For example, if a state shown in FIG. 10C is for portrait display, a state shown in FIG. 10D is for landscape display.

As stated above, preferred embodiments of the present invention have been described, but the present invention is not limited by the above embodiments. Embodiments of the present invention may be modified in various manners in addition to the aforementioned ones.

For example, in the foregoing embodiment, B, G and R light is entered into the liquid crystal panels 108, 111 and 117 for modulation, and then the modulated light is synthesized in the dichroic prism 118. Alternatively, light in a wavelength band other than the aforementioned ones may be additionally modulated in a corresponding liquid crystal panel, the modulated light may be synthesized together with the B, G and R light, and the synthesized light may be entered into the projection lens unit 20. For example, if there is a spectrum component in a yellow wavelength band (hereinafter referred to as "Y light") besides B, G and R light emitted from a lamp in the light source 11, the Y light may be split by the dichroic mirror and relayed by a relay lens to guide to a corresponding liquid crystal panel, and then the Y light modulated in the liquid crystal panel may be synthesized together with the B, G and R light in the dichroic prism.

In addition, although a lamp is used as a light source in the foregoing embodiment, the present invention is also applicable to projectors using a laser source and hybrid-type projectors using a combination of lamp and laser source.

Further, in the foregoing embodiment, light from the projection lens unit 20 is reflected by one mirror part 30a toward the projection plane. Alternatively, the projection mirror unit

30 may have a plurality of mirrors so that light from the projection lens unit 20 can be reflected by mirror(s) and then guided to the mirror part 30*a*.

Moreover, a configuration of the illumination optical system 10 may be modified as appropriate. The present invention is also applicable to projectors using a reflective panel as an imager. Further, the present invention is applicable to projectors using a DMD (digital micro-mirror device) as an imager.

Embodiments of the present invention can be modified as appropriate in various manners without departing from a scope of a technical idea set forth in the claims.

What is claimed is:

1. A projection display device comprising:
    an illumination optical system for illuminating modulated light in accordance with a video signal, the illumination optical system including a light source and an imager for modulating light from the light source in accordance with the video signal;
    a projection lens unit into which light is entered from the illumination optical system;
    a projection mirror unit for reflecting light from the projection lens unit; and
    a moving mechanism for moving the projection lens unit and the projection mirror unit relative to the imager, between a first position where an image is projected in a shape that is longer along a direction of projection onto a projection plane and a second position where an image is projected in a shape that is longer along a direction perpendicular to the direction of projection onto a projection plane.

2. The projection display device according to claim 1, wherein
    the moving mechanism includes a holder rotating relative to the illumination optical system and holding the projection lens unit such that a center of an optical axis of the projection lens unit is positioned eccentrically with respect to a center of the rotation thereof.

3. The projection display device according to claim 2, wherein
    the center of the rotation of the holder aligns in an optical manner approximately with a center position of the imager in the illumination optical system, and
    assuming that a distance between the center of the rotation of the holder and the center of the optical axis of the projection lens unit is r and that a dimension of a display area of the imager along a long axis is b, a position of the projection lens unit with respect to the holder is set such that r>b/2 is satisfied.

4. The projection display device according to claim 2, wherein
    the holder rotates relative to the illumination optical system, between a first rotation position where an optical axis plane containing the center of the optical axis of the projection lens unit and the central axis of light projected from the projection mirror unit is approximately perpendicular to an optical element placement plane of the illumination optical system and a second rotation position where the optical axis plane is approximately parallel to the optical element placement plane, and
    assuming that the illumination optical system is divided into first and second areas by the optical axis plane when the holder is in the first rotation position, light from the projection lens unit when the holder is in the second rotation position travels toward, out of the first and second areas, either one that is smaller in dimension along a direction perpendicular to the optical axis plane.

5. The projection display device according to claim 4, wherein
    the imager in the illumination optical system is placed such that a surface along a short axis thereof is positioned on the optical element placement plane.

6. The projection display device according to claim 1, comprising:
    a sensor for detecting whether relative positions of the projection lens unit and the mirror unit are in the first position or the second position; and
    an image processing part for switching a video signal processing mode based on a result of detection by the sensor.

7. The projection display device according to claim 1, comprising:
    a screen holding mechanism that can be attached to and detached from a screen.

* * * * *